US012719358B2

(12) United States Patent
Pillonnet et al.

(10) Patent No.: US 12,719,358 B2
(45) Date of Patent: Aug. 25, 2026

(54) POWER CONVERTER

(71) Applicant: Commissariat à l'Energie Atomique et aux Energies Alternatives, Paris (FR)

(72) Inventors: Gaël Pillonnet, Grenoble (FR); Sami Oukassi, Grenoble (FR); Emeric Perez, Grenoble (FR); Yasser Moursy, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 162 days.

(21) Appl. No.: 18/521,095

(22) Filed: Nov. 28, 2023

(65) Prior Publication Data

US 2024/0186897 A1 Jun. 6, 2024

(30) Foreign Application Priority Data

Dec. 5, 2022 (FR) ....................................... 2212739

(51) Int. Cl.
*H02M 3/07* (2006.01)

(52) U.S. Cl.
CPC .................................... *H02M 3/07* (2013.01)

(58) Field of Classification Search
CPC ......... H02M 3/156; H02M 1/088; H02M 3/07
See application file for complete search history.

(56) References Cited

U.S. PATENT DOCUMENTS

2013/0106380 A1* 5/2013 Marsili ................... H02M 3/07 323/283
2016/0181925 A1* 6/2016 Chiang ............ H02M 3/33584 363/17
2017/0207035 A1 7/2017 Gardner et al.
2019/0246223 A1 8/2019 Larsen et al.
2020/0212686 A1* 7/2020 Oukassi ................ H02J 7/0024

FOREIGN PATENT DOCUMENTS

EP 3570307 A1 11/2019
EP 3796351 A1 3/2021
EP 4102527 A1 12/2022

OTHER PUBLICATIONS

Kushnerov, Alexander, and Fedor Bukashev. "On power losses in switched supercapacitor circuits." In 2014 16th International Power Electronics and Motion Control Conference and Exposition, pp. 1100-1103. IEEE, 2014.

Jonscher, Andrew K. "Dielectric relaxation in solids." Journal of Physics D: Applied Physics 32, No. 14 (1999): R57.

* cited by examiner

*Primary Examiner* — Crystal L Hammond
*Assistant Examiner* — Jonathan Walter Soileau
(74) *Attorney, Agent, or Firm* — Jordan IP Law, LLC

(57) ABSTRACT

The present description concerns a DC-DC converter (100) comprising a first node (N1) and a second node (N2) intended to receive a DC voltage to be converted; a third node (N3) intended to deliver a DC voltage referenced to the second node; at least one first solid electrolyte capacitor (C1); at least one first switching cell (420) formed of four switches (421, 422, 431, 432) respectively coupling a first electrode of the capacitor to the first node and to the third node and a second electrode of the capacitor to the second node and to the third node; the switching frequency of the switches being adapted to the power required at the output and to selecting an operating mode of the first capacitor from among an electrostatic operating mode and an ionic operating mode.

26 Claims, 9 Drawing Sheets

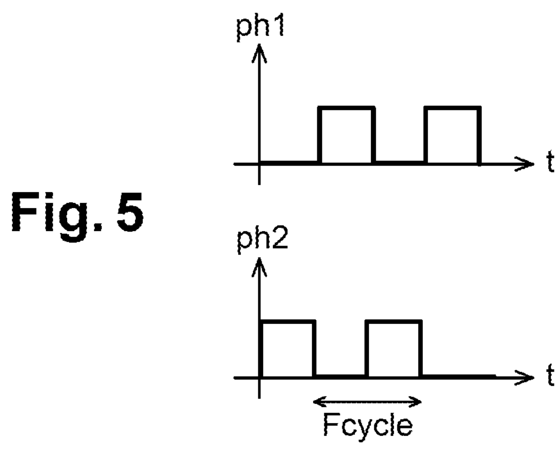
Fig. 5
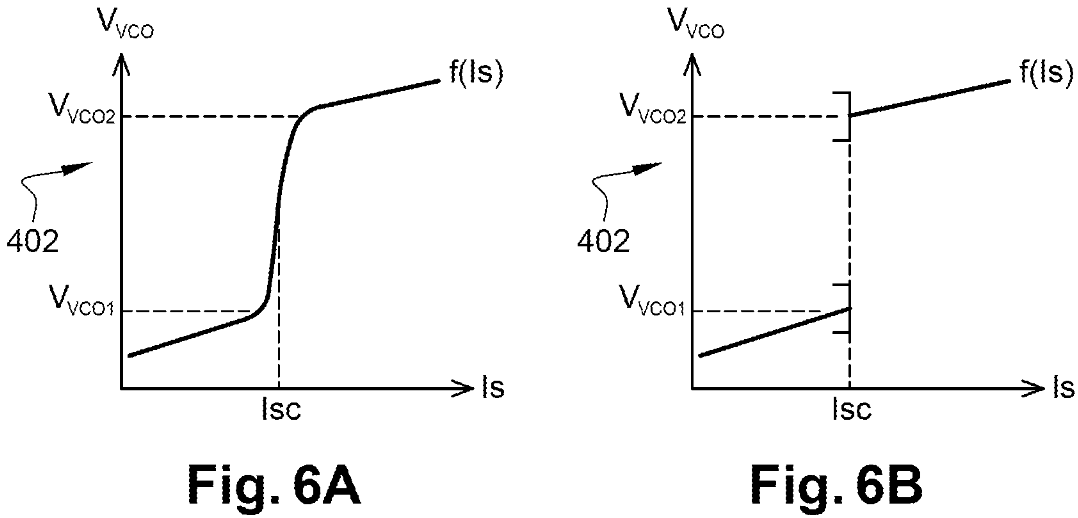
Fig. 6A
Fig. 6B
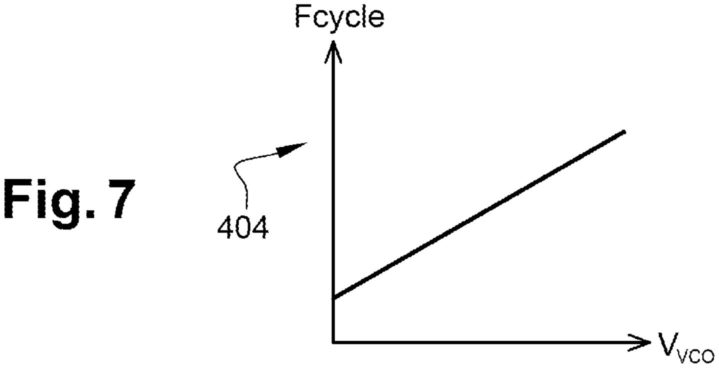
Fig. 7

POWER CONVERTER

FIELD

The present description generally concerns power converters.

BACKGROUND

There exists a wide variety of power converters. The present disclosure more particularly relates to DC-DC converters based on a switched capacitor.

SUMMARY

There exists a need to improve DC-DC converters.

An embodiment overcomes all or part of the disadvantages of known converters.

An embodiment provides a DC-DC converter comprising:

a first node and a second node intended to receive a DC voltage to be converted;

a third node intended to deliver a DC voltage referenced to the second node;

at least one first solid electrolyte capacitor;

at least one first switching cell formed of four switches respectively coupling a first electrode of the capacitor to the first node and to the third node and a second electrode of the capacitor to the second node and to the third node;

the switching frequency of the switches being adapted to the power required at output and to selecting one operating mode of the first capacitor from among an electrostatic operating mode and an ionic operating mode.

An embodiment provides a DC-DC converter comprising:

a first node and a second node intended to receive a DC voltage to be converted;

a third node intended to deliver a DC voltage referenced to the second node;

at least one first solid electrolyte capacitor having an ionic-type operation below a cutoff frequency and an electrostatic-type operation for higher frequencies;

at least one first switching cell formed of four switches respectively coupling a first electrode of the capacitor to the first node and to the third node and a second electrode of the capacitor to the second node and to the third node;

the switching frequency of the switches being adapted to the power required at the output and to selecting an operating mode of the first capacitor from among the electrostatic operating mode and the ionic operating mode.

An embodiment provides a method of controlling a DC-DC converter comprising:

a first node and a second node intended to receive a DC voltage to be converted;

a third node intended to deliver a DC voltage referenced to the second node;

at least one first solid electrolyte capacitor;

at least one first switching cell formed of four switches respectively coupling a first electrode of the first capacitor to the first node and to the third node and a second electrode of the first capacitor to the second node and to the third node;

the switching frequency of the switches being adapted to the power required at the output and to selecting an operating mode of the first capacitor from among an electrostatic operating mode and an ionic operating mode.

An embodiment provides a method of controlling a DC-DC converter comprising:

a first node and a second node intended to receive a DC voltage to be converted; a third node intended to deliver a DC voltage referenced to the second node;

at least one first solid electrolyte capacitor having an ionic-type operation below a cutoff frequency and an electrostatic-type operation for higher frequencies;

at least one first switching cell formed of four switches respectively coupling a first electrode of the first capacitor to the first node and to the third node and a second electrode of the first capacitor to the second node and to the third node;

the switching frequency of the switches being adapted to the power required at the output and to selecting an operating mode of the first capacitor from among the electrostatic operating mode and the ionic operating mode.

According to an embodiment, the selection of the operating mode is a function of a law of variation of said switching frequency according to at least one piece of information relative to an input or output power of the converter.

According to an embodiment, said at least one piece of information belongs to a group comprising a voltage, a current, a power, a temperature, and their respective variation.

According to an embodiment, said variation law has a transfer function of proportional and/or integral and/or derivative type.

According to an embodiment, the variation law causes an abrupt frequency change at the passing from one operating mode to the other.

According to an embodiment, the frequency variation is continuous.

According to an embodiment, said change causes a discontinuity in the frequency variation.

According to an embodiment, such a converter or method comprises:

at least one second solid electrolyte capacitor;

at least one second switching cell formed of four switches respectively coupling a first electrode of the second capacitor to the first node and to the third node and a second electrode of the second capacitor to the second node and to the third node;

the switching frequency of the switches of the second switching cell being adapted to the power required at the output and to selecting an operating mode of the second capacitor from among an electrostatic operating mode and an ionic operating mode.

According to an embodiment, a selection rule is implemented to activate or deactivate the second switching cell according to the input and/or output power of the converter.

According to an embodiment, the control frequency of the switches of the second cell is phase-shifted with respect to the control frequency of the switches of the first cell.

According to an embodiment, at least one oscillator coupled to the third node of the converter is configured to deliver the switching frequency of the switches.

According to an embodiment, a distinct oscillator is associated with each operating mode.

According to an embodiment, a distinct variation law is associated with each operating mode.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which:

FIG. 5 illustrates, in the form of timing diagrams, examples of control signals of the converter of FIG. 4;

FIG. 6A illustrates, in the form of a voltage-vs.-current graph, the operation of the converter of FIG. 4;

FIG. 6B illustrates, in the form of a voltage-vs.-current graph, another operation of the converter of FIG. 4;

FIG. 7 illustrates, in the form of a frequency-vs.-voltage graph, the operation of the converter of FIG. 4;

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
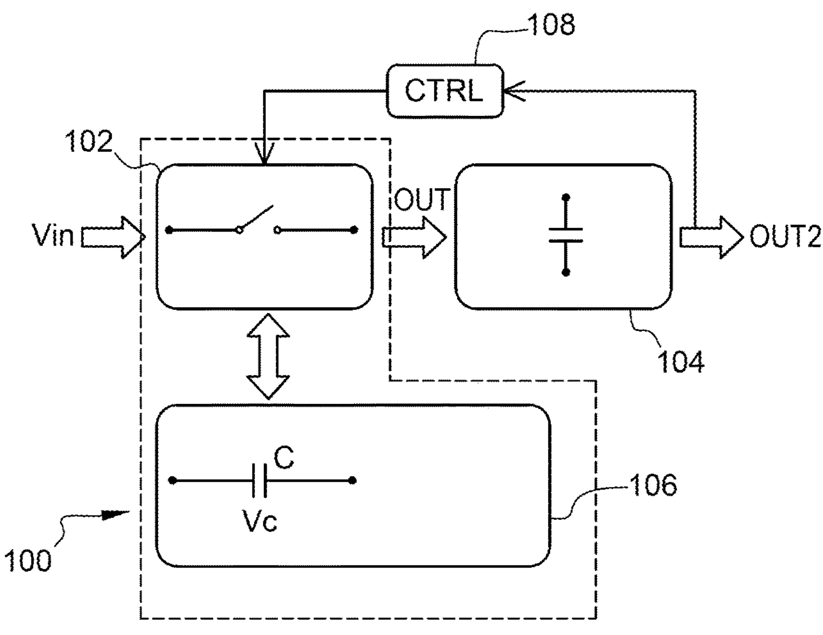
FIG. 1 schematically illustrates an example of a switched capacitor power converter.

FIG. 1 schematically shows an example of a switched capacitor power converter.

A switched capacitor converter uses an alternation of capacitor charge and of discharge cycles by varying the frequency, and/or the switching duty cycle of the cells, and/or the capacitance value, and/or the size of the switches, which modulates their on-state resistance.

The converter of FIG. 1 comprises an energy conversion stage 100 having a switching cell 102 comprising a plurality of switches organizing the charge of one or a plurality of capacitors 106 (C) of an energy conversion stage 100 based on a DC voltage Vin to be converted and their discharge towards an output node OUT generally coupled to a load (not shown) coupled to a node OUT2 by an optional filtering capacitor 104. According to an example, not shown, filtering capacitor 104 is not present and the converter intrinsically acts as a filter. La frequency and/or the switching duty cycle of cell 102 and/or the value of the capacitor, and/or the size of the switches, are set by a control circuit 108 (CTRL) according to the power required by the load.

Figure 2:
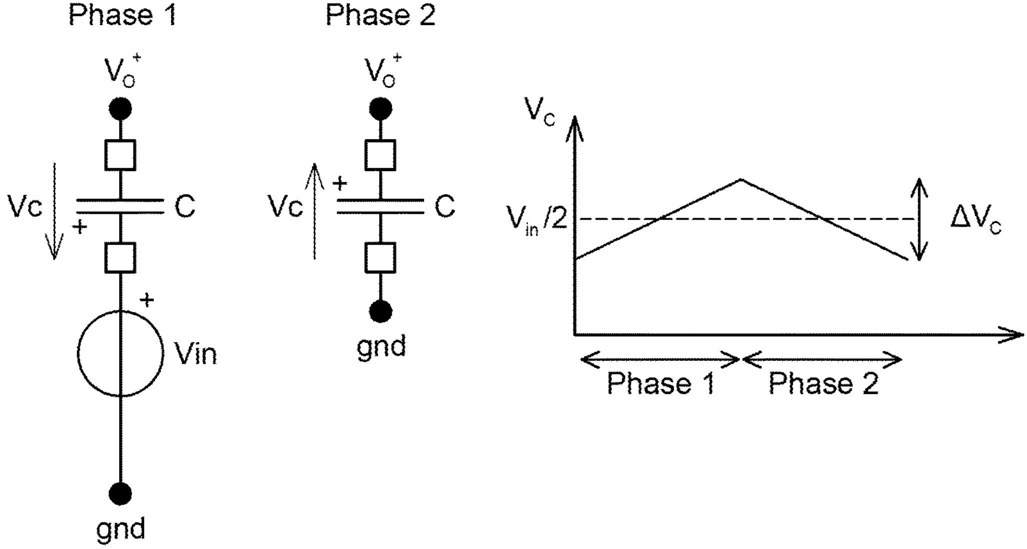
FIG. 2 illustrates, in the form of equivalent electrical diagrams and of a timing diagram, the operation of the converter of FIG. 1.

FIG. 2 illustrates, in the form of equivalent electric diagrams and of a timing diagram, the operation of the converter of FIG. 1.

Two equivalent electric diagrams respectively corresponding to the charge (Phase 1) and discharge (Phase 2) cycles or phases are illustrated in FIG. 2. These phases alternate at the rate set by the switching cell. The timing diagram of FIG. 2 illustrates an example of time variation of the voltage Vc across capacitor C and more particularly during the charge (Phase 1) and discharge (Phase 2) cycles. During charge phases, capacitor C is in series with the source of voltage Vin between output terminal V0+ and the ground (gnd). Charges are then accumulated in the capacitor and the voltage Vc thereacross increases. During discharge phases, the capacitor is connected to ground to discharge into the load connected at the output and its voltage Vc decreases. The polarity of voltage Vc reverses between charge and discharge phases. In steady state, as illustrated by the timing diagram, the voltage Vc across the capacitor has a median value corresponding to half Vin/2 of power supply voltage Vin.

The quantity of charges transmitted from the input to the output of the converter is directly proportional to the voltage oscillation or excursion on the capacitor ΔVc.

At each end of phase 2, the capacitor is connected back to input Vin and the amplitude of oscillation ΔVc induces a loss by charge sharing, decreasing the power efficiency of the converter. Indeed, the recharging of the capacitor causes a current peak crossing the switches (resistive) which is proportional to ΔVc.

To decrease the excursion of voltage ΔVc, a solution is to increase the capacitance value. Another solution is to increase the switching frequency. However, the more the switching frequency increases, the more this increases switching losses in the switches of the switching cell.

When it is desired to integrate in a chip, that is, monolithically, an entire converter, including the capacitor, one cannot use liquid electrolyte capacitors, despite the fact that they have a significant capacitance volume density. It is then preferred to use capacitors called electrostatic since they are compatible with methods used in microelectronics. Electrostatic capacitors are formed of two electrodes facing each other separated by a dielectric and store the charges at the surface of the electrodes. Accordingly, these capacitors have a surface storage. The surface density may be increased with capacitors called "3D" or "Trench" which use the two horizontal and vertical dimensions of a substrate but this still has a limited efficiency for power converters.

The present disclosure originates from a new analysis of a behavior of capacitors having which have appeared more recently, called solid electrolyte capacitors. Such capacitors are commonly called solid electrolyte supercapacitors due to their high surface capacitance (in the plane of an integrated circuit). They provide more significant charge storage capacitances than an electrostatic capacitor due to their ionic operation. Solid electrolyte supercapacitors particularly have capacitance values in the order of ten times higher than those of capacitors in the form of trenches in silicon substrates and in the order of one thousand times higher than those of surface capacitors. A solid electrolyte capacitor is formed of at least two electrodes made of an electronically-conductive material, separated by a solid-state ion conductor dielectric material, commonly called solid electrolyte. A plurality of families of materials are considered to assume this role, such as for example amorphous glasses, for example LiPON (Lithium phosphorus oxynitride), crystallized oxides from the family of perovskites and LLTO (Lithium lanthanum titanate oxide) garnets, LLZO (Lithium lanthanum Zircon oxide), LATP ($Li_{1.3}Al_{0.3}Ti_{1.7}(PO4)_3$), and LGPS ($Li_{10}GeP_2S_{12}$) or LPS ($Li_3PS_4$) sulfides for the case of lithium solid electrolytes.

These components are characterized by a double capacitive response: a first one in a low-frequency range linked to the forming of a double electrochemical layer at the electrode/electrolyte interface, and a second one linked to the dielectric biasing of the solid electrolyte. This specificity is characteristic of ionic capacitors implementing a solid electrolyte.

However, solid electrolyte supercapacitors lose their efficiency at a high frequency due to the lower mobility of ions, on which their operating principle relies, as compared with electrons, which are used by electrostatic capacitors.

Figure 3:
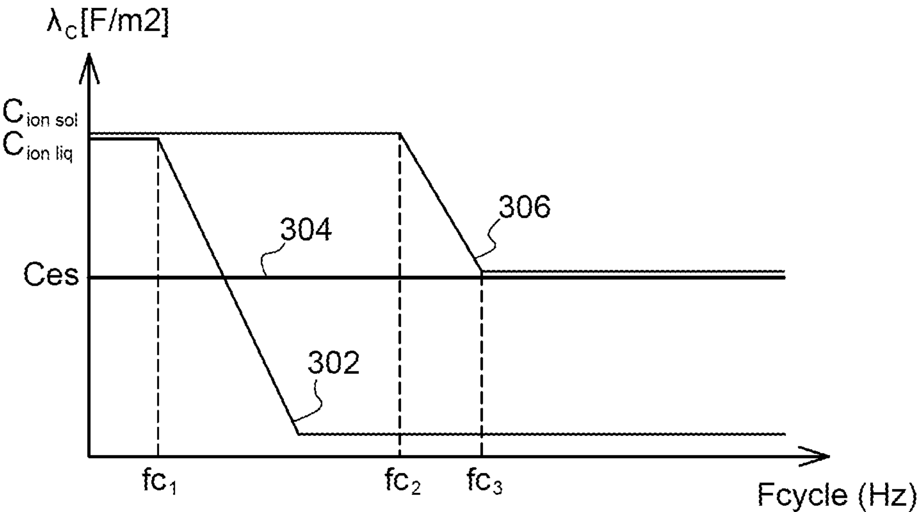
FIG. 3 illustrates the variation of the surface capacitance of different types of switched capacitors according to the switching frequency.

FIG. 3 shows the variation of the surface capacitance of different types of switched capacitor according to the switching frequency.

This drawing highlights the surface density differences (in the plane of an integrated circuit or substrate) according to frequency for different types of capacitors.

Curve 304 shows the variation of the value of an electrostatic capacitor Ces, which is in the form of trenches, per surface area unit. This value remains stable independently from frequency due to the surface operation (the charges are stored in the electrodes) of such a capacitor.

Curve 302 shows the variation of the value of a liquid electrolyte capacitor (Cion liq) per surface area unit. These capacitors are particularly adapted to a static storage and are thus efficient, in switched mode, at low frequency. It can be considered that below a frequency fc1, which is in the order of one Hz at room temperature, the surface capacitance is greater, by approximately a factor 20, than that of an electrostatic capacitor Ces of same nominal value. Beyond frequency fc1, the value per surface area unit of the liquid electrolyte capacitor decreases to become lower than that of electrostatic capacitor Ces.

Curve 306 shows the variation of the value of a solid electrolyte capacitor (Cion sol) per surface area unit. Below a frequency fc2, that is, between 10 kHz and 1 MHz at room temperature, the capacitance value is equivalent to that of a solid electrolyte capacitor in ionic operation. However, the frequency from which the surface capacitance decreases and the capacitor leaves an ionic operation is greater than the frequency in the case of a liquid electrolyte capacitor. Further, for frequencies higher than frequency fc2, the surface capacitance becomes of the same order of magnitude as that of an electrostatic capacitor Ces which would be formed in the form of trenches, which remains higher than that of a liquid electrolyte capacitor. It can be said that a solid electrolyte capacitor has an ionic-type operation until a certain switching frequency and an electrostatic-type operation beyond. The electrostatic-type operation is said to be stabilized beyond a frequency fc3 higher than frequency fc2.

It is provided to take advantage of this specificity of solid electrolyte capacitors to adapt the operation of a converter between an ionic operation and an electrostatic operation according to the needs of the load. More precisely, the described embodiments provide using in controlled fashion the operating mode of the solid electrolyte capacitor of a converter according to the use and/or to the application of the converter into which it is integrated to take advantage of the ionic mode when the application bears on a high energy density (and a high conversion efficiency) and of the electrostatic mode during power demands non provided for by the ionic mode.

Figure 4:
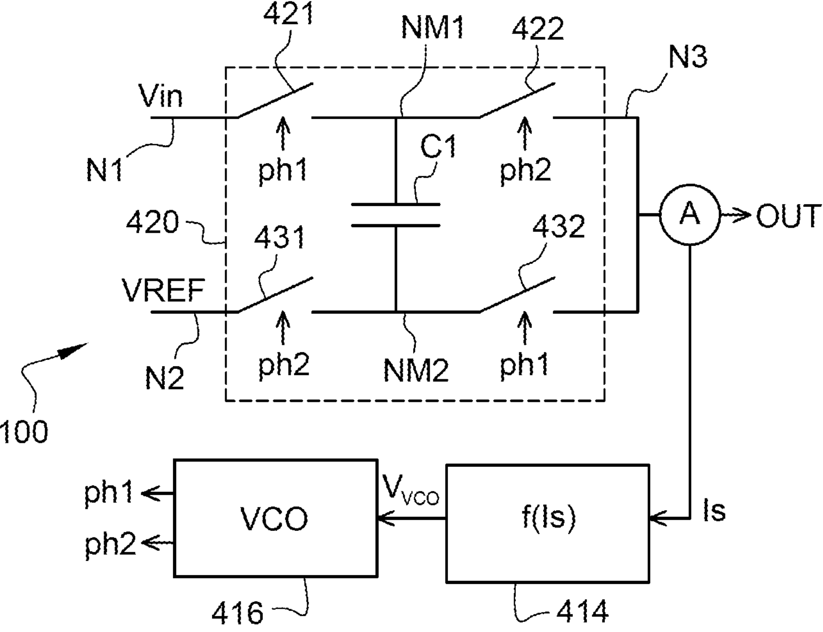
FIG. 4 illustrates an embodiment of a power converter.

FIG. 4 illustrates an embodiment of a power converter 100.

According to the example of FIG. 4, the power converter is a DC-DC converter. The converter comprises a first node N1 and a second node N2 intended to receive a DC voltage to be converted Vin-VREF, VREF for example being the ground. The converter of FIG. 4 comprises a third node N3 intended to deliver a DC voltage OUT referenced to the second node.

The converter of FIG. 4 also comprises at least one first solid electrolyte capacitor C1 and at least one first switching cell 420 for example formed of four switches 421, 422, 431, 432. The four switches respectively couple a first electrode NM1 of the capacitor C1 to first node N1 and to third node N3 and a second electrode NM2 of the capacitor to second node N2 and to third node N3. The first and second electrodes of the capacitor C1 are coupled, respectively connected, to the respective junction points of the series associations of switches 421, 422 and 431, 432.

In other words:

- switch 421 couples node N1 to the first electrode NM1 of capacitor C1;
- switch 422 couples node N3 to the first electrode NM1 of capacitor C1;
- switch 431 couples node N2 to the second electrode of capacitor C1; and
- switch 432 couples the second electrode of the capacitor to node N3.

Switches 421 and 432 are controlled by a signal ph1. Switches 422 and 431 are controlled by a signal ph2, signals ph1 and ph2 being in phase opposition. The switches are controlled in frequency modulation with a specific control rule, while keeping for example a 50% duty cycle, or possible in pulse width modulation (PWM). The switching frequency of the switches is adapted according to the power required at the converter output.

According to described embodiments, the first capacitor is in an electrostatic operating mode or in an ionic operating mode according to the switching frequency. In other words, capacitor C1 passes from one operating mode to another according to the switching frequency. Advantage is here taken of the specificity of the response (FIG. 3) in terms of operating mode of a solid electrolyte capacitor according to frequency.

In the example of FIG. 4, the control signals ph1 and ph2 of switches 421, 422, 431, and 432 are delivered by a voltage-controlled oscillator 416 (VCO) which receives a set point Vvco from a circuit 414 applying, to data representative of the output power (more precisely of the variation of the power demanded by the load powered by the converter), a law of variation of the switching frequency to be applied to the switches. In the shown example, the information representative of the output power (demanded by the load coupled to node N3) corresponds to a measurement Is of the output current. Circuit 414 then applies a law f(Is) of variation of the frequency according to current Is. As a variant, the information representative of the power (of variation of the power) demanded by the load is the output voltage, the temperature, etc.

In the example of FIG. 4, circuits 414 and 416 are shown as separate. It should however be noted that they be may be one and the same circuit. According to another variant, the frequency variation law corresponds to a software implementation, circuit 414 then corresponding to a processor.

FIG. 5 illustrates, in the form of timing diagrams, examples of signals ph1 and ph2 for controlling the converter of FIG. 4.

In the simplified example of FIG. 5, the signals ph1 and ph2 originating from oscillator 416 are of square pulse type and in phase opposition. In the example of FIG. 5, the frequency Fcycle determined by the variation law of circuit 414 is identical and steady over a plurality of periods and the duty cycle is 50%. However, a frequency variation can be envisaged. In practice, signals ph1 and ph2 are slightly phase-shifted to avoid a simultaneous conduction of switches 421 and 422, respectively 431 and 432.

FIG. 6A illustrates, in the form of a voltage-vs.-current graph, the operation of the converter of FIG. 4.

FIG. 6A more particularly illustrates the variation law f(Is) implemented by block 414 in the form of the variation of the voltage Vvco for controlling oscillator 416 according to the output current Is of the converter.

In the example of FIG. 6A, voltage Vvco follows a curve comprising two portions having a relatively light slope, approximately linear, separated by a so-called “deflection” portion having a relatively strong slope (as compared with the slopes of the two other portions) for a so-called critical current value Isc. For currents Is smaller than value Isc, voltage Vvco increases from a minimum value Vvco1 to abruptly but continuously deflect when critical current Isc has been reached to reach a value Vvco2 from which the voltage starts varying again according to a relatively low slope, value Vvco2 being greater than value Vvco1.

The discontinuity in the variation law f(Is) of FIG. 6A corresponds to the continuous passage from an ionic operating mode to an electrostatic operating mode of the capacitor C1 such as illustrated in FIG. 3 for frequencies higher than frequency fc2. This enables to decrease the transient effects of an abrupt passage from one frequency to another which might create possible charge losses.

Function f(Is) may be defined on manufacturing, calibrated after the manufacturing, occasionally recalibrated, and/or controlled in real time by the estimation of the current efficiency for example via additional voltage and current measurements. The value of critical current Isc depends on the intrinsic performance of capacitor C1 but also on the sizing of the switching cell. The value of critical current Isc is for example in the range from 1 mA to 1 A. This value is inversely proportional to the capacitance value, to the cutoff frequency, and to the power supply voltage, and is proportional to the switching period and to the size of the transistors. For a 1-μF capacitance, a 100-kHz cutoff frequency and under a 2-V input, the value is approximately 1 mA.

FIG. 6B illustrates, in the form of a voltage-vs.-current graph, another operation of the converter of FIG. 4.

The example of FIG. 6B is similar to that of FIG. 6A except that function f(Is) is defined piecewise and is formed of the two “light” slope portions without the continuous deflection portion of FIG. 6A between values Vvco1 and Vvco2. In the case of FIG. 6B, when the current exceeds value Isc, voltage Vvco “jumps” from value Vvco1 to value Vvco2 without taking an intermediate value. The value of voltage Vvco1 for example corresponds to frequency fc2 and the value of voltage Vvco2 corresponds to frequency fc3 where the capacitance is stabilized at its electrostatic capacitance value Ces. This enables to directly pass from an ionic behavior to an electrostatic behavior without passing through a continuous decrease of the capacitance.

FIG. 7 illustrates, in the form of a frequency-vs.-voltage graph, the operation of the converter of FIG. 4. More particularly, FIG. 7 illustrates a variation law implemented by oscillator 416 in the form of the variation of switching frequency Fcycle according to the control voltage Vvco of oscillator 416. In the example of FIG. 7, frequency Fcycle linearly increases along with voltage Vvco. In other examples not illustrated, the variation is for example non-linear or frequency Fcycle decreases as voltage Vvco increases.

Figure 8A:
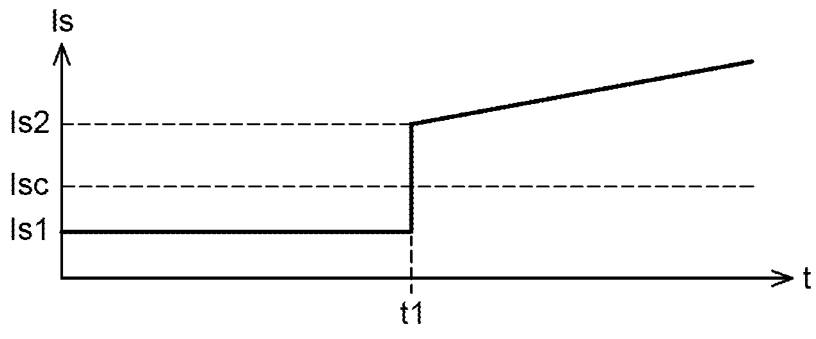
FIG. 8A illustrates, in the form of a timing diagram, the operation of the converter of FIG. 4.

FIG. 8A illustrates, in the form of a timing diagram, the operation of the converter of FIG. 4. More particularly, FIG. 8A illustrates an example of shape of current Is as a function of time.

In the example of FIG. 8A, current Is follows a curve comprising two approximately linear slope portions, separated by a so-called “deflection” portion of quasi-vertical slope at a time t1 when the value of current Is crosses critical current value Isc. Before time t1, current Is is steady at a minimum value Is1 lower than critical current value Isc. At time t1, current Is increases from minimum value Is1 to abruptly but continuously deflect by exceeding critical current Isc to reach a value Is2 from which the current starts increasing according to a relatively light slope.

Figure 8B:
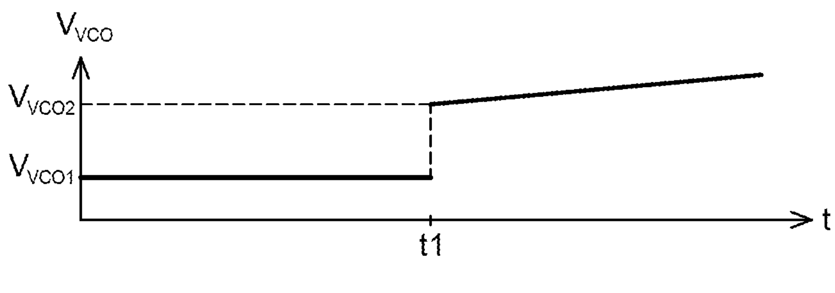
FIG. 8B illustrates, in the form of a timing diagram, the operation of the converter of FIG. 4.

FIG. 8B illustrates, in the form of a timing diagram, the operation of the converter of FIG. 4. More particularly, FIG. 8B illustrates an example of shape of voltage Vvco as a function of time over a time interval identical to that of FIG. 8A. In the example of FIG. 8B, voltage Vvco is kept steady to generate a steady frequency until time t1. At time t1, voltage Vvco “jumps” from value Vvco1 to value Vvco2 without taking an intermediate value. This enables to directly pass from an ionic behavior to an electrostatic behavior without going through a continuous decrease of the capacitance. Beyond time t1, voltage Vvco linearly increases to increase the frequency.

Figure 8C:
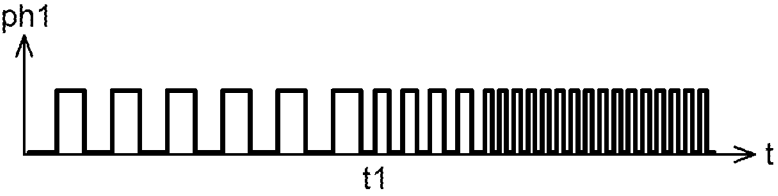
FIG. 8C illustrates, in the form of a timing diagram, examples of control signals of the converter of FIG. 4.

FIG. 8C illustrates, in the form of a timing diagram, examples of control signals of the converter of FIG. 4. More particularly, control signal ph1 exhibits frequency fc2 until time t1. From time t1, the frequency increases above frequency fc3 to pass from an ionic behavior to a stabilized electrostatic behavior.

Figure 9:
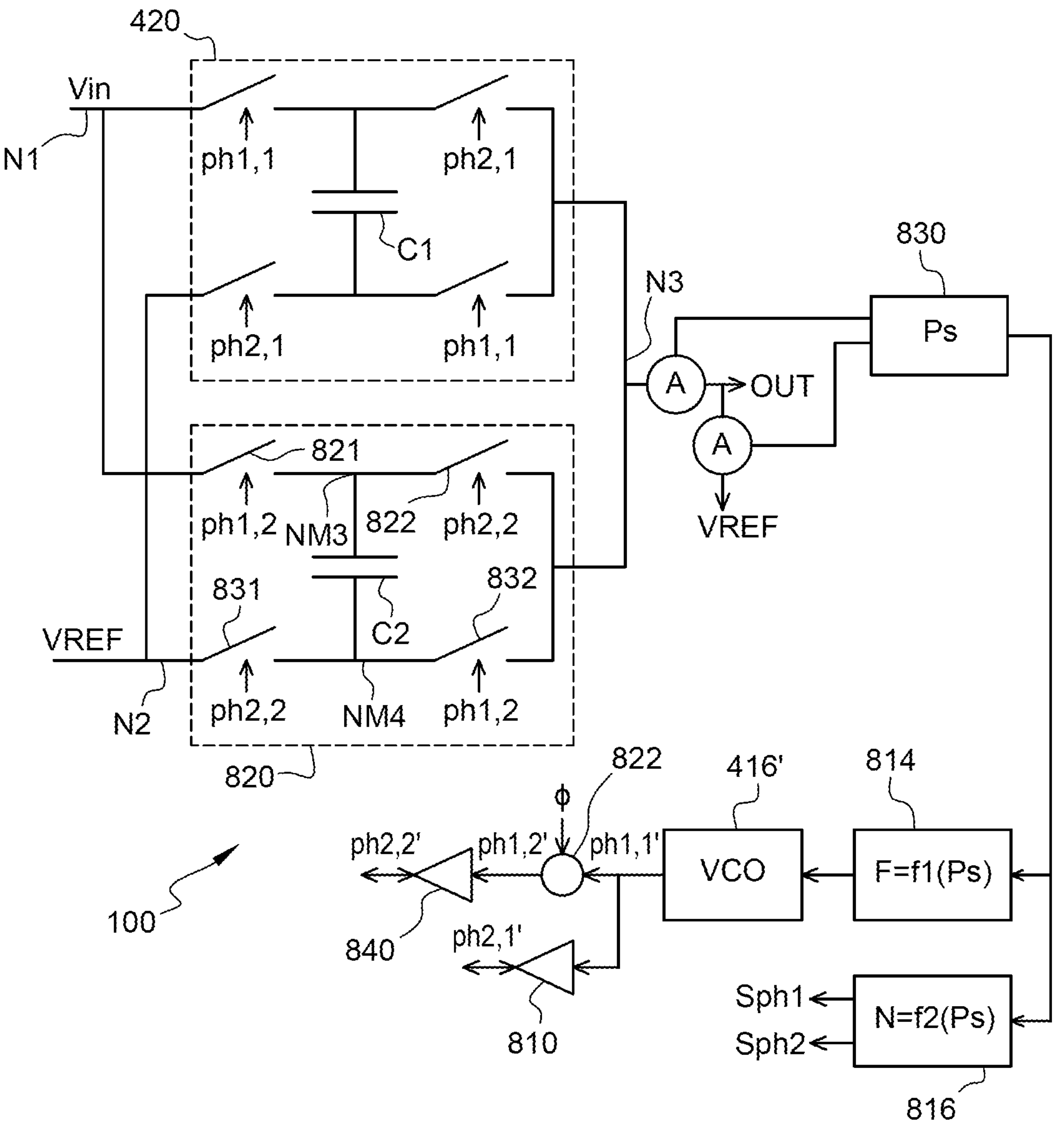
FIG. 9 illustrates another embodiment of a power converter.

FIG. 9 illustrates another embodiment of a power converter 100.

The example of FIG. 9 illustrates the fact that a plurality of structures or stages, each comprising a switching cell and a solid electrolyte capacitor, may be associated in parallel. In the shown example, two switching cells 420 and 820 and two solid electrolyte capacitor C1 and C2, respectively associated with cells 420 and 820 are shown. Cell 820 is for example formed of four switches 821, 822, 831, and 832. The four switches respectively couple a first electrode NM3 of the second capacitor C2 to first node N1 and to third node N3 and a second electrode NM4 of second capacitor C2 to second node N2 and to third node N3. The first and second electrodes of capacitor C2 are coupled, respectively connected, to the respective junction points of the series associations of switches 821, 822 and 831, 832.

In other words:

- switch 821 couples node N1 to the first electrode NM3 of capacitor C2;
- switch 822 couples node N3 to the first electrode NM3 of capacitor C2;
- switch 831 couples node N2 to the second electrode NM4 of capacitor C2; and
- switch 832 couples the second electrode NM4 of capacitor C2 to node N3.

From the point of the view of the control signals, the signals for controlling cell 420, bearing references ph1 and ph2 in FIG. 4, here bear references ph1,1 and ph2,1.

Similarly, the switches 821 and 832 of cell 820 are controlled by a signal ph1,2 and switches 822 and 831 are controlled by a signal ph2,2, signals ph1,2 and ph2,2 being in phase opposition. Like for cell 420, the switches are controlled by varying their switching frequency with a switching frequency adapted to the power required at the converter output, the duty cycle is for example kept stable at 50%. By varying the frequency, the output impedance of the converter changes, which varies the output voltage.

Second capacitor C2 is, similarly to what has been described in relation with capacitor C1, in an electrostatic operating mode or in an ionic operating mode according to the switching frequency.

In the example of FIG. 9, control signals ph1,1 ph2,1 ph1,2, and ph2,2 are obtained from an output signal ph1,1' of a voltage-controlled oscillator 416', similar to that of FIG. 4, and which receives a set point from a circuit 814, similar to circuit 414, applying, to data representative of the output power, a law f1(Ps) of variation of the switching frequency to be applied to the switches. The information representative of the output power corresponds to a determination (circuit 830, (Ps)) of the output power based on measurements of the current (I) and of the voltage (V) at the level of third node N3, delivered to circuit 830. Circuit 416' delivers a signal ph1,1' used to generate two signals ph2,1' and ph2,2' respectively representing the inverse (inverter 810) of signal ph1,1' and signal ph1,1' phase-shifted by a phase shift ph1 ($\phi$) of, for example, 90° and then inverted (inverter 840). These signals ph2,1' and ph2,2' are combined with two signals Sph1 and Sph2 representative of the stage(s) to be used to deliver signals ph1,1, ph1,2, ph2,1, and ph2,2. Signals Sph1 and Sph2 are delivered by a circuit 816 which applies a law f2(Ps) providing the number N (1 or 2) of stages to be used according to power Ps. In an example, when N=1, Sph1=1 and Sph2=0, and when N=2, Sph1=Sph2=1.

Figure 10:
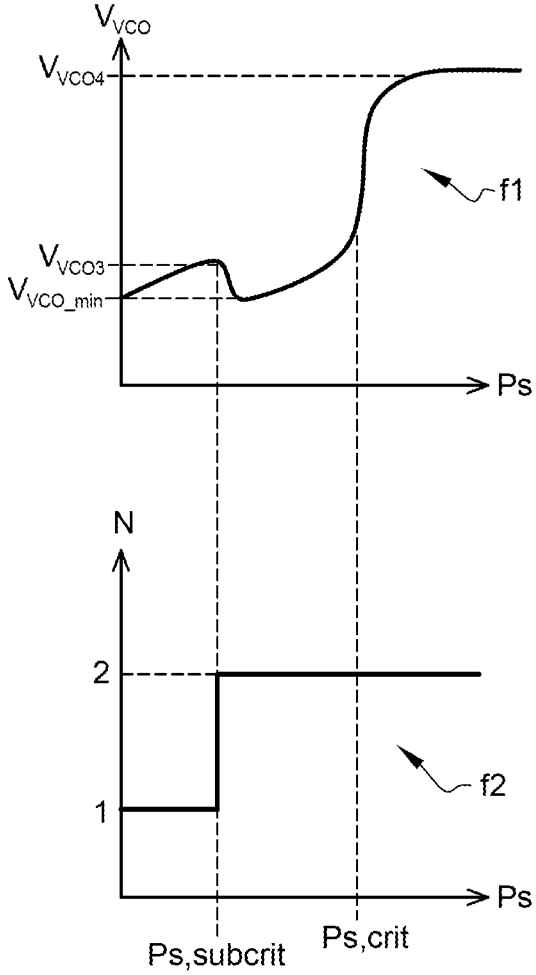
FIG. 10 illustrates, in the form of graphs, the operation of the converter of FIG. 9.

FIG. 10 illustrates, in the form of graphs, the operation of the converter of FIG. 9.

FIG. 10 more particularly illustrates the variation law f1(Ps) implemented by block 814 in the form of the variation of the control voltage of oscillator 416' according to the output power Ps of the converter.

FIG. 10 also illustrates the variation law f2(Ps) implemented by block 816 in the form of the number of stages N=1 or 2 according to the output power Ps of the converter.

In the example of FIG. 10, voltage Vvco follows a curve comprising two portions of relatively light slopes, approximately linear, separated by a so-called slope “deflection” portion, first negative at the level of a power value called “subcritical” Ps,subcrit, and then positive and relatively strong (as compared with the slopes of the two other portions) at the level of a power value called “critical” Ps,crit, higher than the subcritical value.

For powers lower than value Ps,subcrit, voltage Vvco increases up to a value Vvco3 and then abruptly decreases down to a minimum value Vvco_min corresponding to subcritical power Ps,subcrit. Beyond subcritical power Ps,subcrit, voltage Vvco increases until it abruptly deflects at the level of critical power Ps,crit to reach a value Vvco4 from which the voltage starts varying again according to a relatively light slope, value Vvco4 being greater than value Vvco3 and Vvco_min.

In the example of FIG. 10, the number of stages N used is one for powers lower than subcritical power Ps,subcrit and two for higher powers. In other words, for powers lower than subcritical power Ps,subcrit, only the first switching cell 420 is used (capacitor C1 operating in ionic mode) and for powers higher than subcritical power Ps,subcrit, both switching cells 420 and 820 are used. Between powers Ps,subcrit and Ps,crit, the switching frequency is such that capacitors C1 and C2 operate in ionic mode. The use of one or of two capacitors in ionic mode enables to optimize the efficiency according to the power demand. Beyond the determined power Ps,crit, the variation law f1(Ps) causes the use of the capacitors in electrostatic mode.

Figure 11:
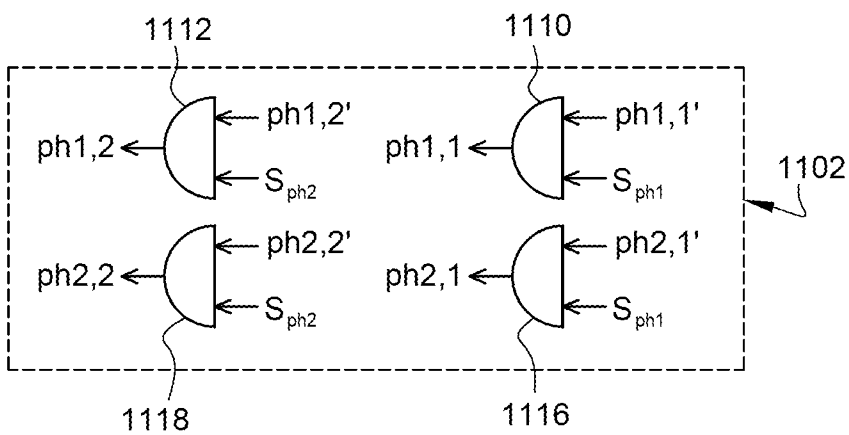
FIG. 11 very schematically illustrates an embodiment of a circuit for determining control signals of the converter of FIG. 9.

FIG. 11 very schematically illustrates an embodiment of a circuit 1102 for determining control signals of the converter of FIG. 9.

Circuit 1102 receives, as an input, signals Sph1, Sph2, ph1,1', ph1,2', ph2,1', and ph2,2', performs logic combinations of these signals and delivers, as an output, signals ph1,1, ph1,2, ph2,1, and ph2,2.

In the shown example:

- an AND-type logic gate 1110 combines signals ph1,1' and Sph1 and delivers signal ph1,1;
- an AND-type logic gate 1112 combines signals ph1,2' and Sph2 and delivers signal ph1,2;
- an AND-type logic gate 1116 combines signals ph2,1' and Sph1 and delivers signal ph2,1; and
- an AND-type logic gate 1118 combines signals ph2,2' and Sph2 and delivers signal ph2,2.

Figure 12:
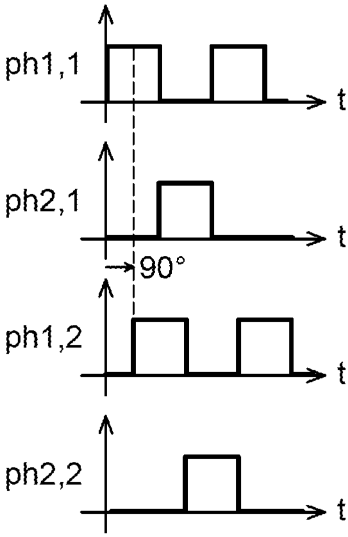
FIG. 12 illustrates, in the form of timing diagrams, the operation of the converter of FIG. 9.

FIG. 12 illustrates, in the form of a timing diagrams, the operation of the converter of FIG. 9.

The timing diagram of FIG. 12 more particularly shows an example of shapes of signals ph1,1, ph2,1, ph1,2, and ph2,2.

There is arbitrarily assumed a 50% duty cycle as in FIG. 5. Signals ph1,1 and ph2,1 thus have shapes similar to those described in relation with FIG. 5. Since the two stages can operate simultaneously, signals ph1,2 and ph2,2 have a same duty cycle as signals ph1,1 and ph2,2, that is, here, 50%. In the example of FIG. 12, signals ph1,1 and ph1,2, respectively ph2,1 and ph2,2, are phase-shifted by 90° (any other phase shift may be provided).

Figure 13:
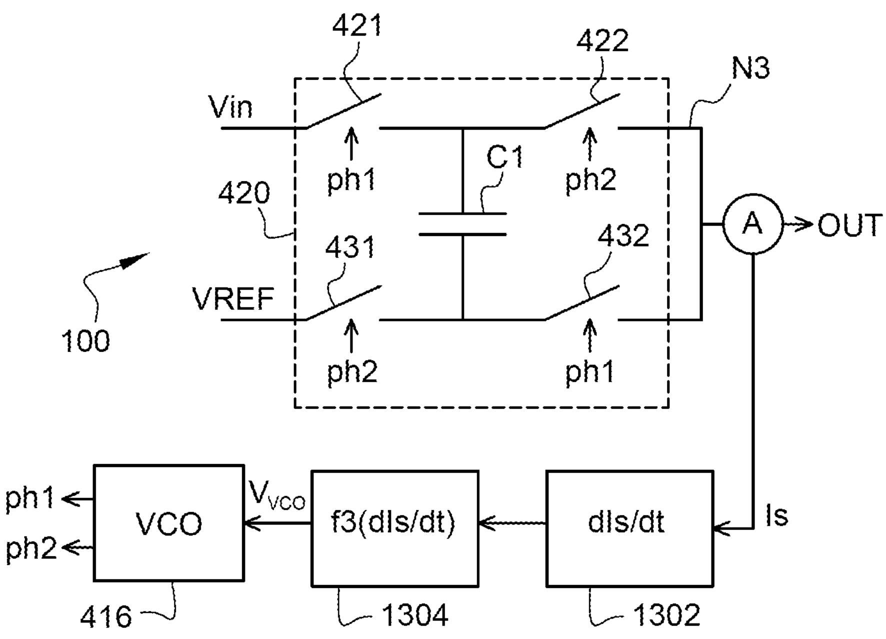
FIG. 13 illustrates another embodiment of a power converter.

FIG. 13 illustrates another embodiment of a power converter 100.

The shown example is similar to the example of FIG. 4 except for block 414, which is replaced with a block 1302, (dIs/dt) determining a time variation (derivative) of the output current Is, for example linked to a change of power demand by the load, and a block 1304, applying a variation law f3(dIs/dt) to the data representative of the derivative of the output current, provided by block 1302. Voltage-controlled oscillator 416 receives set point Vvco from circuit 1304 and delivers signals ph1,1 and ph1,2.

The example shown in FIG. 13 enables to temporarily switch from an ionic mode to an electrostatic mode during an output current draw to benefit from another voltage response of the converter, and then to return to the ionic mode.

In the example of FIG. 13, circuits 1302 and 1304 are shown as separate. It should however be noted that they may be one and the same circuit. According to another variant, the frequency variation law corresponds to a software implementation by a processor.

Figure 14:
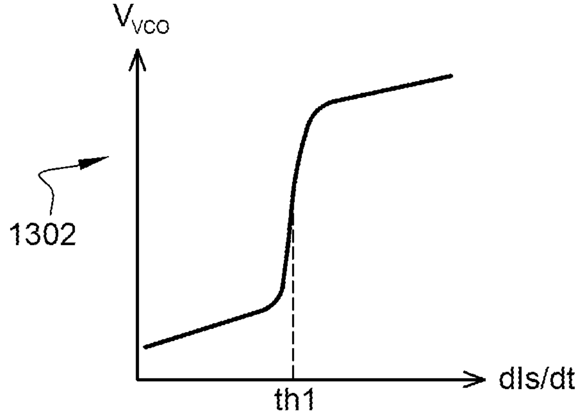
FIG. 14 illustrates, in the form of a graph, the operation of the converter of FIG. 13.

FIG. 14 illustrates, in the form of a graph, the operation of the converter of FIG. 13.

FIG. 14 more particularly illustrates the variation law f3(dIs/dt) implemented by block 1304 in the form of the variation of the control voltage Vvco of oscillator 416 according to the time derivative dIs/dt of the output current Is of the converter.

The variation law f3(dIs/dt) of FIG. 14 is similar to the variation law shown in FIG. 6A, the voltage Vvco of FIG. 14 deflecting for a value th1 in a way equivalent to the deflection occurring for value Isc in FIG. 6A.

It may be advantageous to temporarily switch from an ionic mode to an electrostatic mode during an output current draw to benefit from a better voltage response of the converter, and then to switch back to the ionic mode when the power demand decreases again.

Figure 15:
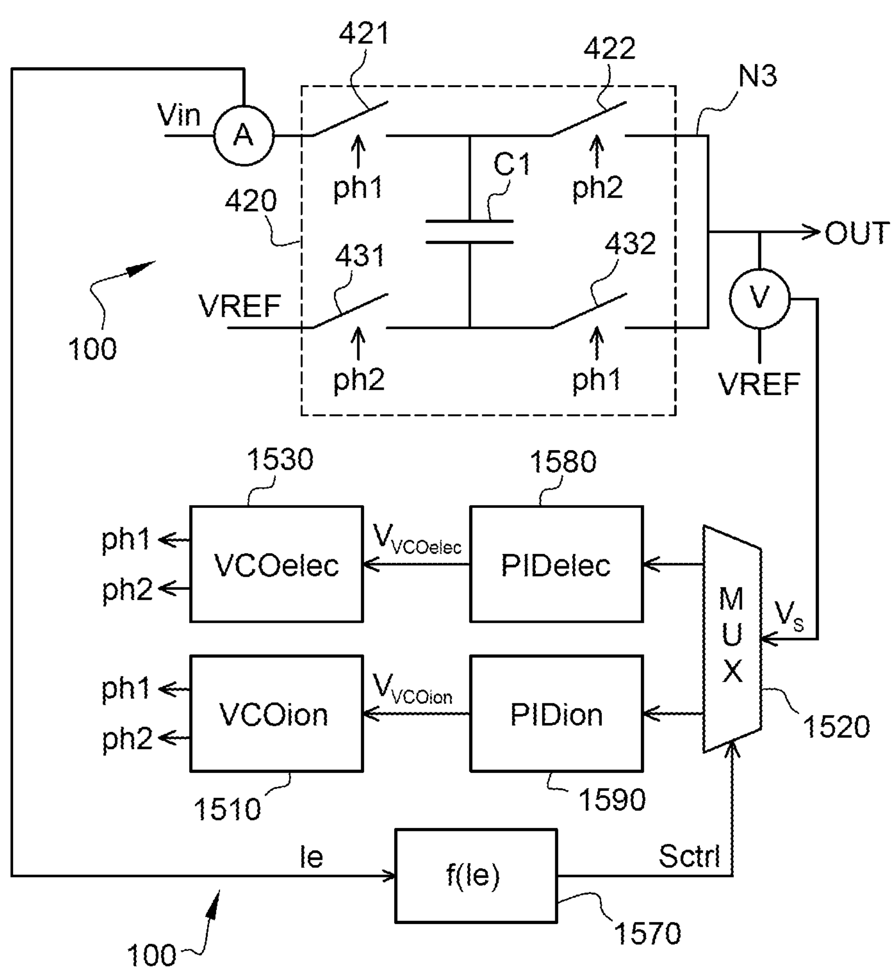
FIG. 15 illustrates another embodiment of a power converter.

FIG. 15 illustrates another embodiment of a power converter 100.

The shown converter comprises the first switching cell 420 of FIG. 4.

In the example of FIG. 15, the control signals ph1 and ph2 of switches 421, 422, 431, and 432 are delivered, either by a voltage-controlled oscillator 1530 (VCOelec), or by a voltage-controlled oscillator 1510 (VCOion), according to a selection performed by a multiplexer 1520 (MUX). Oscillator 1530 receives a set point Vvcoelec from a circuit 1580 (PIDelec) applying, to data representative of the output power, here output voltage Vs (measurement circuit V), a transfer function, of proportional-integral-derivative type, defining a law of variation of the cutoff frequency to be applied to the switches for an operation of capacitor C1 in ionic mode. Oscillator 1510 receives a set point Vvcoion from a circuit 1590 (PIDelec) applying, to the data representative of the output power, a transfer function, of proportional-integral-derivative type, defining a law of variation of the switching frequency to be applied to the switches for an operation of capacitor C1 in electrostatic mode. The transfer functions of circuits 1580 and 1590 may be identical or different, that is, their proportional, integral, and derivative coefficients may be identical or different from one circuit to the other.

In the shown example, multiplexer 1520 receives as an input the data representative of the output power (of voltage Vs in the case of FIG. 15) and is controlled by a block 1570 implementing a function f(Ie) of selection of the electrostatic or ionic mode according to data representative of the input power of the converter (of input current Ie, circuit A, in the case of FIG. 15). According to the control signal Sctrl originating from block 1570, multiplexer 1520 transfers the value of voltage Vs to circuit 1580 or to circuit 1590.

In the example of FIG. 15, circuits 1580 and 1590 or 1530 and 1510 are shown as separate. It should however be noted that they can be one and the same circuit.

According to another variant, the variation law of the respective frequency of circuits 1580 and/or 1590 corresponds to a software implementation, circuits 1580 and/or 1590 then corresponding to a processor.

In an example, the value of the proportionality coefficient of blocks 1580 or 1590 is approximately 1 (if the transfer function of blocks 1530 or 1510 is unitary). In another example, the value of the integration coefficient of blocks 1580 or 1590 is defined with a function inversely proportional to the cutoff frequency. In another example, the value of the derivation coefficient of blocks 1580 or 1590 is linked to the time constant of the capacitor formed by the value of the capacitor and of its access resistance.

Figure 16:
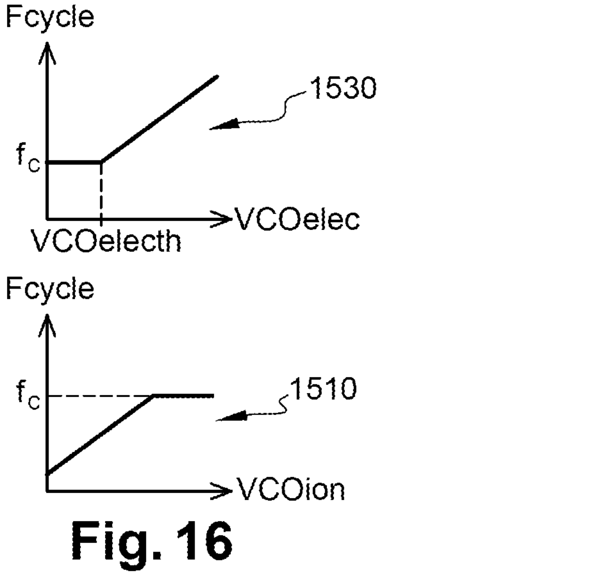
FIG. 16 illustrates, in the form of a frequency-vs.-voltage graph, the operation of the converter of FIG. 15.

FIG. 16 illustrates, in the form of frequency-vs.-voltage graphs, the operation of the converter of FIG. 15.

FIG. 16 more particularly illustrates the variation of the switching frequency fcycle of the output signals of oscillators 1510 and 1530.

In the case of oscillator 1510, frequency fcycle increases, for example linearly, as voltage VCOion increases, until it reaches a plateau value fc which is no longer exceeded afterwards.

In the case of oscillator 1530, frequency fcycle remains steady at value fc as long as voltage VCOelec has not reached a value VCOelecth. Beyond value VCOelecth, frequency fcycle increases, for example linearly.

Figure 17:
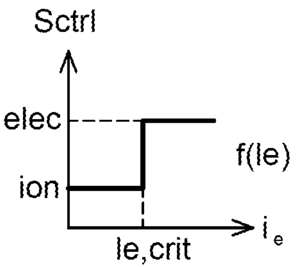
FIG. 17 illustrates, in the form of a graph, the operation of the converter of FIG. 15.

FIG. 17 illustrates, in the form of a graph, the operation of the converter of FIG. 15.

FIG. 17 more particularly illustrates the function f(Ie) determining the multiplexer control signal Sctrl according to the input current Ie of the converter. Below a current Ie,crit called “critical”, signal Sctrl controls the multiplexer to select the branch (PID regulator 1590 and oscillator 1510) dedicated to the ionic mode. Above current Ie,crit, signal Sctrl controls the multiplexer to select the branch (PID regulator 1580 and oscillator 1530) dedicated to the electrostatic mode.

The example of FIG. 15 enables to control the mode of the capacitor C1 according to the converter efficiency due to the use of a value representative of the input power (in this case input current Ie) for the regulation of the output voltage.

Various embodiments and variants have been described. Those skilled in the art will understand that certain features of these various embodiments and variants may be combined, and other variants will occur to those skilled in the art. In particular, other configurations may be envisaged such as the series connection in a first phase between the first switching cell 420 and the second switching cell 820 of FIG. 9, and a second parallel connection in a second phase to generate various voltage ratios between the input and the output. In another case, it is possible to combine the variation law f3(dIs/dt) of FIG. 13 with the law f(Is) of FIG. 4. In this case, the dynamic loop would temporarily take over during a variation of the conditions in order to be favorably located in the area of interest of the capacitor.

In the shown examples and generally, the threshold for passing from one mode to the other can be dynamically determined by a convergence algorithm (for example by "perturbation and observation"). For example, in the example of FIG. 6A, a dynamic calculation of the efficiency could be implemented (by also measuring the input power), after which the switching threshold would be modulated to maximize the efficiency.

In the shown examples, each capacitor may be formed of a plurality of capacitors arranged in series and/or in parallel.

A measurement of the temperature may be performed in addition to the information representative of the input or output power of the converter. The different control rules may thus integrate this temperature information to define the mode used. For example in the example of FIG. 4, current threshold Isc could be modulated by the temperature. If the temperature increases, this threshold increases. Indeed, the transition frequency between the modes strongly depends on temperature.

In cases where a plurality of switching cells are envisaged, an additional control rule selecting part of the capacitors in ionic mode and the other part in electrostatic mode can be envisaged. This enables to find a compromise between the ripple of the output voltage and the efficiency.

In a variant to the measurement of output current Is, it is possible to measure the input current of the converter which, to within the converter efficiency, reflects the output current. In another variant, instead of using the output current, the voltage ripple across the capacitor may be measured. This ripple is a good indication of the contribution of charge sharing losses.

Finally, the practical implementation of the described embodiments and variants is within the abilities of those skilled in the art based on the functional indications given hereabove. In particular, the control functions disclosed in the described embodiments may be applied to other types of switched capacitor converter, such as boost or buck converters, of series-parallel, Dickson or Fibonacci type for example, or also to converters called "hybrid" using the concomitance of capacitances and of inductances to achieve a DC-DC conversion function.

What is claimed is:

1. DC-DC converter comprising:

a first node and a second node intended to receive a first DC voltage to be converted;

a third node intended to deliver a second DC voltage referenced to the second node;

at least one first solid electrolyte capacitor having an ionic-type operation below a cutoff frequency and an electrostatic-type operation for higher frequencies;

at least one first switching cell formed of four switches respectively coupling a first electrode of the capacitor to the first node and to the third node and a second electrode of the capacitor to the second node and to the third node;

a switching frequency of the switches being adapted to a power required at an output and to selecting an operating mode of the first capacitor from among the electrostatic-type operation and the ionic-type operation.

2. Method of controlling a DC-DC converter comprising:

a first node and a second node intended to receive a first DC voltage to be converted;

a third node intended to deliver a second DC voltage referenced to the second node;

at least one first solid electrolyte capacitor having an ionic-type operation below a cutoff frequency and an electrostatic-type operation for higher frequencies;

at least one first switching cell formed of four switches respectively coupling a first electrode of the first capacitor to the first node and to the third node and a second electrode of the first capacitor to the second node and to the third node;

a switching frequency of the switches being adapted to a power required at an output and to selecting an operating mode of the first capacitor from among the electrostatic-type operation and the ionic-type operation.

3. Converter according to claim 1, wherein the selection of the operating mode is a function of a law of variation of said cutoff frequency according to at least one piece of information relative to an input or output power of the converter.

4. Converter according to claim 3, wherein said at least one piece of information belongs to a group comprising a voltage, a current, a power, a temperature, and their respective variations.

5. Converter according to claim 3, wherein said variation law has a transfer function of proportional and/or integral and/or derivative type.

6. Converter according to claim 3, wherein the variation law causes an abrupt frequency change at the passing from one operating mode to the other.

7. Converter according to claim 6, wherein the frequency variation is continuous.

8. Converter according to claim 6, wherein said change causes a discontinuity in the frequency variation.

9. Converter according to claim 1, comprising:

at least one second solid electrolyte capacitor;

at least one second switching cell formed of four switches respectively coupling a first electrode of the second capacitor to the first node and to the third node and a second electrode of the second capacitor to the second node and to the third node;

a switching frequency of the switches of the second switching cell being adapted to the power required at the output and to selecting an operating mode of the second capacitor from among an electrostatic operating mode and an ionic operating mode.

10. Converter according to claim 9, wherein a selection rule is implemented to activate or deactivate the second switching cell according to the input and/or output power of the converter.

11. Converter according to claim 9, wherein the switching frequency of the switches of the second cell is phase-shifted with respect to the switching frequency of the switches of the first cell.

12. Converter according to claim 1, wherein at least one oscillator coupled to the third node of the converter is configured to deliver the switching frequency of the switches.

13. Converter according to claim 12, wherein a distinct oscillator is associated with each operating mode.

14. Converter according to claim 3, wherein a distinct variation law is associated with each operating mode.

15. Method according to claim 2, wherein the selection of the operating mode is a function of a law of variation of said cutoff frequency according to at least one piece of information relative to an input or output power of the converter.

16. Method according to claim 15, wherein said at least one piece of information belongs to a group comprising a voltage, a current, a power, a temperature, and their respective variations.

17. Method according to claim 15, wherein said variation law has a transfer function of proportional and/or integral and/or derivative type.

18. Method according to claim 15, wherein the variation law causes an abrupt frequency change at the passing from one operating mode to the other.

19. Method according to claim 18, wherein the frequency variation is continuous.

20. Method according to claim 18, wherein said change causes a discontinuity in the frequency variation.

21. Method according to claim 2, comprising:

at least one second solid electrolyte capacitor;

at least one second switching cell formed of four switches respectively coupling a first electrode of the second capacitor to the first node and to the third node and a second electrode of the second capacitor to the second node and to the third node;

the switching frequency of the switches of the second switching cell being adapted to the power required at the output and to selecting an operating mode of the second capacitor from among an electrostatic operating mode and an ionic operating mode.

22. Method according to claim 21, wherein a selection rule is implemented to activate or deactivate the second switching cell according to the input and/or output power of the converter.

23. Method according to claim 21, wherein the control frequency of the switches of the second cell is phase-shifted with respect to the control frequency of the switches of the first cell.

24. Method according to claim 2, wherein at least one oscillator coupled to the third node of the converter is configured to deliver the switching frequency of the switches.

25. Method according to claim 24, wherein a distinct oscillator is associated with each operating mode.

26. Method according to claim 15, wherein a distinct variation law is associated with each operating mode.

* * * * *